(No Model.) 2 Sheets—Sheet 1.

W. A. SMALL.
HARROW AND WEEDER.

No. 464,396. Patented Dec. 1, 1891.

WITNESSES:
W. R. Davie
C. Sedgwick

INVENTOR:
W. A. Small
BY Munn & Co.
ATTORNEYS (No Model.) 2 Sheets—Sheet 2.

W. A. SMALL.
HARROW AND WEEDER.

No. 464,396. Patented Dec. 1, 1891.

WITNESSES:
W. R. Davis
C. Sedgwick

INVENTOR:
W. A. Small
BY Munn & Co
ATTORNEYS

UNITED STATES PATENT OFFICE.

WILLIAM A. SMALL, OF ESBON, KANSAS.

HARROW AND WEEDER.

SPECIFICATION forming part of Letters Patent No. 464,396, dated December 1, 1891.

Application filed May 18, 1891. Serial No. 393,160. (No model.)

*To all whom it may concern:*

Be it known that I, WILLIAM A. SMALL, of Esbon, in the county of Jewell and State of Kansas, have invented a new and useful Improvement in Harrows and Weeders, of which the following is a full, clear, and exact description.

My invention relates to a combined harrow and weeder; and has for its object to provide an implement capable of cultivating two, three, or more rows of listed corn at one operation, and also to provide a means whereby the implement may be constructed in sections and the end sections be capable of a lateral movement sufficient to correspond to the swaying movement of the team drawing the implement. Another object of the invention is to provide weeding-knives which may be adjusted vertically or laterally, and which knives will effectually remove weeds not only from the ridges, but also from the furrows between the ridges; and a further object of the invention is to so construct the sections of the implement that they may be independently adjusted for proper work in rows of varying width and to provide the sections with harrow-teeth adjustable both vertically and laterally.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
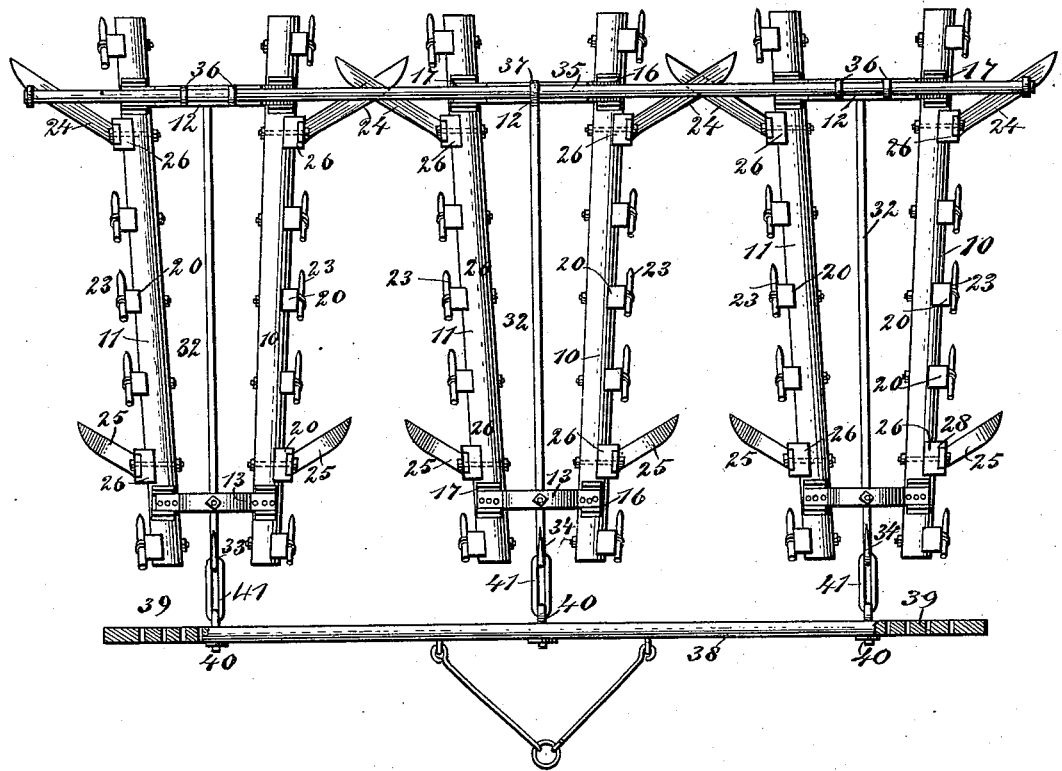
Figure 2:
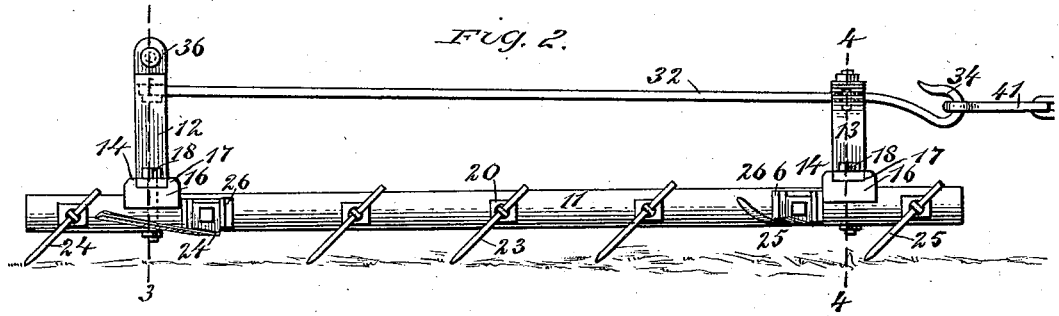
Figure 3:
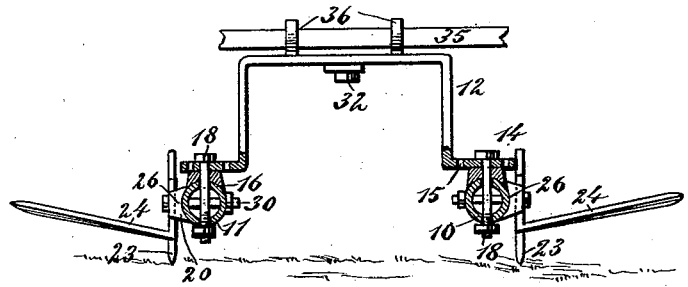
Figure 4:
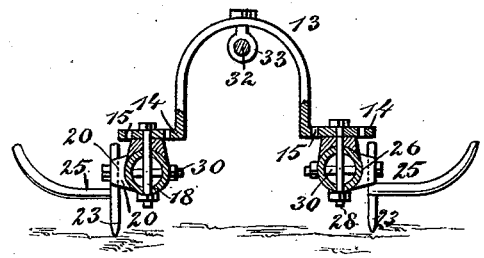
Figure 5:
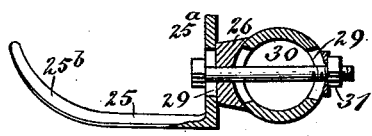
Figure 6:
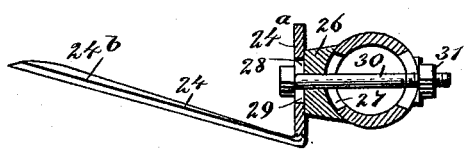
Figure 7:
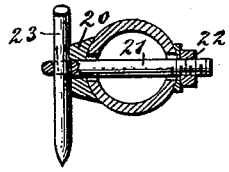

Figure 1 is a plan view of the implement. Fig. 2 is a side elevation thereof. Fig. 3 is a vertical section through one of the harrow-sections, taken practically on the line 3 3 of Fig. 2; and Fig. 4 is a similar section taken practically on the line 4 4 of Fig. 2. Fig. 5 is a vertical section through a beam of the implement and also a partial section through one of the forward knives, illustrating the application of the knives to the beams. Fig. 6 is a similar section to that shown in Fig. 5, the knife illustrated, however, being a rear knife; and Fig. 7 is a section through one of the beams of the implement, illustrating the manner of adjustably attaching the harrow-teeth thereto.

The implement is constructed of a series of sections, preferably three in number. The sections are identical in construction, with the exception of details, and a description of one will practically answer for all. Each section consists of two beams 10 and 11, the said beams being preferably made tubular and from piping. The beams are of the same length and diverge at their rear ends, the space between the forward ends of the beams being much narrower than that between the rear ends, as is illustrated in Fig. 1. The beams are connected by two yokes 12 and 13, the yoke 12 being located at the rear and the yoke 13 at the front of the section. The yokes are provided at the lower ends of their members with outwardly-extending horizontal feet 14, in which a number of apertures 15 are longitudinally produced, and the attachment of the yokes to the beams is effected by locating upon the upper faces of the beams blocks 16, their under faces being concaved to fit the convex surface of the beams, as shown in Fig. 3. The blocks are provided in their upper faces with transverse grooves or channels 17 of sufficient width to neatly receive the feet 14 of the yokes, and a bolt 18, provided with a suitable nut, is passed through an aperture in the foot of each yoke, through a block, and through the beam upon which the block is located, as is best shown in Figs. 3 and 4. By reason of the apertures 15 being located in the feet of the yokes, the beams 10 and 11 of a section may be brought closer together or carried farther apart than illustrated to accommodate rows of corn or other plants to be cultivated of varying width.

The rear yoke 12 is flat upon the top, but the forward yoke 13 is preferably provided with a rounding upper portion. Along the sides of each beam of a section a number of blocks 20 is located at suitable distances apart, the blocks being concave upon their inner faces to fit the contour of the beams, and they are preferably provided with a series of notches in their outer faces and with a central aperture. Through the aperture of the blocks, and likewise through the beams upon which the blocks are located, eyebolts 21 are horizontally passed, the eyes of the bolts being at their outer ends, and the inner ends of the bolts are provided with suitable nuts 22, as is best shown in Fig. 7. The harrow-teeth 23, which may be of any approved construction, are placed in the eyes of the bolts 21, and when the nuts 22 of the bolts are loosened the teeth may be adjusted vertically or laterally to any desired angle, and when so adjusted they are rigidly held in said position by screwing up the nuts 22. The notches in the outer faces of the blocks are the same as those ordinarily employed in connection with seats for harrow-teeth.

At the rear of each beam of a section knives 24 are located, adapted to cut weeds in the furrows between the rows of corn, and another set of knives 25 is located near the forward end of the section, the latter knives being adapted to cut the weeds from the ridges.

The knives 24 at the rear are located one at each side of the section, and each of said knives consists of a vertical shank 24$^a$ and a blade 24$^b$, the forward edge of the blades being the cutting-edge. The blades extend rearward at an angle of about forty-five degrees to the shank, and the blades are further slanted upward and their upper faces are inclined downward from the back to the cutting-edge, as is best shown in Fig. 6.

The attachment of the knives 24 is effected through the medium of blocks 26, curved upon their inner faces to fit the contour of the beams of the section, and where the blocks engage with the beams oppositely-located peripheral slots 27 are produced in the latter, as is likewise best shown in Fig. 6. In the forward faces of the blocks 26 vertical grooves or channels 28 are produced, the said channels being adapted to neatly receive the vertical shank members 24$^a$ of the knives 24, and the said shank members are each provided with a vertical slot 29. Bolts 30, provided with suitable nuts 31, are passed through the slots in the shank members of the knives, through apertures in the blocks 26, and through the slots 27 in the beams. By this mode of attachment it is evident that the knives may be carried downward or upward, so as to travel above the ground at any desired distance or engage with the ground, and that by canting the blocks 26 upon the beams the lateral inclination of the knives may be changed at will. The forward knives 25 also consist of a vertical shank-section 25$^a$ and a blade-section 25$^b$. These knives are attached in a like manner as are the rear knives, as illustrated in Fig. 5; but the blade-sections 25$^b$ of the knives extend rearward at an angle of about forty-five degrees to the shank members and the blades are upturned at their outer ends, the upper faces of the blades being beveled from the back to the forward edge, which latter is the cutting-edge.

A draft-rod 32 is secured to the under face of the rear yoke 12, preferably at the central portion thereof, and the said rod extends horizontally outward beneath the front yoke 13 through a suitable hanger 33, attached thereto, and the outer end of the draft-bar is shaped as an upturned hook 34.

In making up an implement of three sections, for instance, a connecting-rod 35 is employed, which rod passes loosely through eyes 36, formed upon the upper face of the rear yokes of the side sections and through a single eye 37, swiveled in the rear yoke of the central section, and when the sections have been coupled the rear knives 24 of opposing sections will overlap, as shown in Fig. 1.

The implement is drawn forward through the medium of a doubletree 38, provided at its outer ends with a series of apertures 39, and eyebolts 40 are passed through one aperture at each end and an aperture in the center, each eyebolt carrying a link 41, adapted to engage with the hooks 34 upon the draft-rods of the sections. By producing the apertures 39 in the doubletree it is evident that the sections may be adjusted close together or far apart, as may be found necessary, and by swiveling the connecting-rod 35 to the central section and permitting the side sections to slide thereon the latter sections will accommodate themselves to the swaying movement of the team as the implement is drawn forward.

The machine is especially intended for working listed corn and requires the services of but one man and a single team. In operation it will clean the grass and weeds from the ridges and furrows of three rows of corn at a time and will loosen the dirt in the furrows. The two outside sections, as heretofore stated, play back and forth on the connecting-rod to suit the width of the furrow. The first time of use in the cultivation of young corn the harrow-teeth are set sloping and a little shallow. The front knives are to clean off the weeds and grass from the ridges, and to do this the knives are set very well down, but at an elevation sufficient to enter the ground a predetermined depth. The rear knives are raised somewhat higher than the front knives, and as the rear knives of opposing sections cross one another they cut all the weeds and grass clean and work loose soil to the corn. The knives will not clog even in the most tenacious soil, owing to the peculiarity of their shape and the manner in which they are set. The horse motion imparts sufficient vibration to the machine to cause the cut material to leave it.

The implement will clean all the weeds from the ridges and furrows, harrow the ground, and leave it in a fine condition. The second time the implement is carried through the ground the beams of the sections are set quite wide apart and the knives are set to travel three or four inches deep in the ridges, and the ridges may be thereby leveled down and fine loose dirt be carried to the growing corn. The machine is capable of adjustment for work in deep or in shallow furrows.

Having thus described my invention, I claim as new and desire to secure by Letters Patent—

1. The combination, with the harrow-sections, each having end yokes 12 13, eyes 36 on the rear yokes 12 of the outer sections, and an eye 37, swiveled upon the rear yoke of the middle section, of the connecting-bar 35, secured in the swiveled eye and sliding through the outer eyes 36, the draft-rods 32, connecting the yokes of said sections, and a tree 38, connected to the draft-rods, substantially as described.

2. A round harrow-beam provided with a transverse bolt-slot, a block 26, having a flat outer face, a concave inner face fitting the exterior of the beam and provided with a transverse aperture, a bolt passing through said slot and block to change the angle of the flat face of the block, and a blade having a slotted shank secured against said flat face by the bolt, substantially as described.

3. A harrow-section comprising tubular beams having transverse bolt-slots 29 27, blocks 26, having concave inner faces engaging the exterior of the beams, the knives 24 and 25, having slotted shanks resting against the outer flat faces of the blocks, bolts extending through said slots 29 27, blocks 26, and shank-slots to impart two adjustments to said knives, the yokes bolted to the tubular beams, and the transverse tooth-clamping bolts and blocks 20, substantially as described.

4. A harrow comprising inner and outer connected sections, each formed of pairs of connected tubular beams, the forward knives 25, having slotted shanks, the rear knives 24, having slotted shanks and crossing each other, the blocks 26, interposed between said shanks and beams with the flat faces next to the shanks and their concave faces next to the round exteriors of the beams and adjustable thereabout, and the transverse bolts 30 for imparting the two adjustments to the knives, substantially as described.

5. A harrow-section having connected side beams, the harrow-teeth clamped along the outer sides thereof, the front knives 25, inclined rearward, curved upward, as at $25^b$, and having vertical slotted shanks at their inner ends bolted to the beams, and the longer rear knives 24, projecting at an upward incline to their slotted vertical shanks $24^a$ and inclined rearward, and bolts securing said shanks to the beams, substantially as described.

WM. A. SMALL.

Witnesses:
FRANK M. DRAKE,
J. B. BAKER.